US012317047B2

(12) United States Patent
Ren et al.

(10) Patent No.: US 12,317,047 B2
(45) Date of Patent: May 27, 2025

(54) VIBRATION SOUNDING DEVICE

(71) Applicant: AAC Microtech (Changzhou) Co., Ltd., Changzhou (CN)

(72) Inventors: Zhang Ren, Shenzhen (CN); Ronglin Linghu, Shenzhen (CN); Wei Song, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 220 days.

(21) Appl. No.: 18/092,932

(22) Filed: Jan. 4, 2023

(65) Prior Publication Data

US 2024/0073618 A1 Feb. 29, 2024

Related U.S. Application Data

(63) Continuation of application No. PCT/CN2022/120292, filed on Sep. 21, 2022.

(30) Foreign Application Priority Data

Aug. 30, 2022 (CN) ........................ 202211045939.0

(51) Int. Cl.

| | |
|---|---|
| ***H04R 9/02*** | (2006.01) |
| ***H04R 1/24*** | (2006.01) |
| ***H04R 7/16*** | (2006.01) |
| ***H04R 9/04*** | (2006.01) |
| ***H04R 9/06*** | (2006.01) |

(52) U.S. Cl.

CPC ............... *H04R 9/025* (2013.01); *H04R 1/24* (2013.01); *H04R 7/16* (2013.01); *H04R 9/047* (2013.01); *H04R 9/063* (2013.01); *H04R 2400/11* (2013.01)

(58) Field of Classification Search

CPC . H04R 1/24; H04R 1/26; H04R 9/025; H04R 9/063

USPC ........................................ 381/182, 401, 402

See application file for complete search history.

(56) References Cited

U.S. PATENT DOCUMENTS

| | | | | |
|---|---|---|---|---|
| 9,674,603 | B1 * | 6/2017 | Yeh ........................ | H04R 9/025 |
| 10,873,801 | B1 * | 12/2020 | Hsu ........................ | H04R 1/288 |
| 2015/0139479 | A1 * | 5/2015 | Lai ........................ | H04R 9/025 381/412 |
| 2021/0067877 | A1 * | 3/2021 | Jeon ........................ | H04S 1/007 |

* cited by examiner

*Primary Examiner* — Katherine A Faley

(74) *Attorney, Agent, or Firm* — Wiersch Law Group

(57) ABSTRACT

A vibration sounding device includes a housing, a sounding unit, and a motor vibration system. The motor vibration system includes a vibration unit and elastic components, and the vibration unit includes coils. The sounding unit includes a frame, a vibration system, a magnetic circuit system, and a front cover. The vibration system includes a first vibration system and a second vibration system. The first vibration system surrounds the second vibration system and is coaxially disposed with the second vibration system. The first vibration system includes a first vibrating diaphragm and a first voice coil. The second vibration system includes a second vibrating diaphragm and a second voice coil. The magnetic circuit system is fixed to the housing. The magnetic circuit system includes a first magnetic gap and a second magnetic gap. The vibration sounding device is small in overall thickness and in size, and excellent in acoustic performance.

9 Claims, 8 Drawing Sheets

A-A

C-C

VIBRATION SOUNDING DEVICE

The present disclosure relates to a field of electroacoustic conversion, and in particular to a vibration sounding device applied to an electronic sound box product.

BACKGROUND

With arrival of mobile internet era, the number of intelligent mobile devices continuously increases, and mobile phones are undoubtedly the most common and most portable mobile terminal devices in the intelligent mobile devices. Currently, the mobile phones have extremely diversified functions, such as high-quality music function and vibration function. Therefore, sounding devices having functions of vibrating and playing sound are widely applied to current intelligent mobile devices.

A sounding device in the related art includes a housing, a sounding unit, and a motor vibration system. The sounding unit and the motor vibration system are accommodated in the housing. The sounding unit includes a frame, a vibration system, and a magnetic circuit system. The vibration system and the magnetic circuit system are respectively fixed on the frame. Magnetic gaps are defined on the magnetic circuit system. The motor vibration system is attached to a side, distal from the vibration system, of the magnetic circuit system.

However, the sounding unit and the motor vibration system of the sounding device in the related art are capable of being independently controlled. Due to a fact that the motor vibration system is stacked below the sounding unit, a thickness of the sounding device is increased, which is difficult to achieve thinning and lighting of the sounding device. In addition, magnetic steels of the sounding unit and the motor vibration system are not on the same plane, and magnetic field driving forces for operating the respective magnetic steels interfere and influence each other, so that the number of the magnetic steels in the sounding device is large, resulting in a large volume of the sounding device that cannot be miniaturized, so that acoustic performance and vibration performance of the sounding device are poor. In addition, how to improve the acoustic performance of the sounding unit on a basis of the sounding device for obtaining better performance of high and low pitch of the sounding unit is a technical problem to be solved.

Therefore, it is necessary to provide a new vibration sounding device to solve the above technical problem.

SUMMARY

The present disclosure aims to provide a vibration sounding device, which is small in overall thickness and size and excellent in acoustic performance.

In order to achieve the above purpose, the present disclosure provides the vibration sounding device, including a housing, a sounding unit, a sound guide channel, and a motor vibration system. An accommodating space is defined in the housing. The sounding unit is accommodated in the accommodating space. The sound guide channel is formed in the accommodating space. The sounding unit is communicated with outside through the sound guide channel. The motor vibration system is accommodated in the accommodating space. The motor vibration system includes a vibration unit and elastic components, the elastic components suspend the vibration unit in the accommodating space. The vibration unit includes coils. The sounding unit includes a frame, a vibration system, a magnetic circuit system, and a front cover. The vibration system and the magnetic circuit system are respectively fixed to the frame. The front cover is covered and fixed on the vibration system. The front cover and the vibration system are spaced together to form a front sound cavity. The sound guide channel communicates the front sound cavity with the outside. The vibration unit is disposed on a side, distal from the front cover, of the magnetic circuit system. The vibration system includes a first vibration system and a second vibration system. The first vibration system and the second vibration system are fixed to the frame. The first vibration system surrounds the second vibration system. The first vibration system is coaxially disposed with the second vibration system. The first vibration system includes a first vibrating diaphragm and a first voice coil. The first vibrating diaphragm is annular and is fixed to the frame. The first voice coil is fixed to the first vibrating diaphragm and drives the first vibrating diaphragm to vibrate and sound. The second vibration system includes a second vibrating diaphragm and a second voice coil. The second voice coil is fixed to the second vibrating diaphragm and drives the second vibrating diaphragm to vibrate and sound. The first vibrating diaphragm surrounds the second vibrating diaphragm at intervals. The magnetic circuit system includes a first magnetic gap and a second magnetic gap. The first magnetic gap and the second magnetic gap are disposed at intervals. The first magnetic gap surrounds the second magnetic gap. The first voice coil is inserted into the first magnetic gap and drives the first vibrating diaphragm to vibrate to generate low pitch. The second voice coil is inserted into the second magnetic gap and drives the second vibrating diaphragm to vibrate to generate high pitch.

Furthermore, the vibration sounding device further includes an insert and a conductive component. The insert is inserted into the magnetic circuit system from one side, distal from the first vibrating diaphragm, of the magnetic circuit system. The insert is fixed to the magnetic circuit system. The conductive component is fixed to the insert. The magnetic circuit system is disposed around the insert. A conductive terminal penetrates through the insert. The second voice coil is connected to the conductive component through the conductive terminal. A first end of the conductive component is connected to the conductive terminal. A second end of the conductive component penetrates through the housing and is at least partially exposed out of the housing.

Furthermore, the sounding unit further includes a supporting frame. The supporting frame is fixed to the housing and surrounds the insert. The magnetic circuit system includes a first magnetic steel, a second magnetic steel, a magnetic bowl, a third magnetic steel, and a magnetic conductive plate. The first magnetic steel is annular and is stacked and fixed to the supporting frame. The second magnetic steel is stacked and fixed to the supporting frame and surrounds the first magnetic steel. The first magnetic steel and the third magnetic steel are spaced apart from the second magnetic steel to form the first magnetic gap. The first magnetic steel and the second magnetic steel are disposed opposite to the coils at intervals. The coils are disposed in a magnetic field range of the first magnetic steel and the second magnetic steel. The magnetic bowl includes a magnetic bowl body and a magnetic bowl extending portion. The magnetic bowl body is annular and is stacked and fixed to the first magnetic steel. The magnetic bowl extending portion is annular and is bent and extends along a direction distal from the supporting frame from an inner circumferential side of the magnetic bowl body. The magnetic bowl extending portion surrounds the insert. The third magnetic steel is stacked and fixed to a side, close to the vibration system, of the magnetic bowl body. The third magnetic steel surrounds the magnetic bowl extending portion. The third magnetic steel and the magnetic bowl extending portion are spaced apart from each other to form the second magnetic gap. The magnetic conductive plate is stacked and fixed to the second magnetic steel. The magnetic conductive plate is fixedly connected to the frame.

Furthermore, the first magnetic steel, the second magnetic steel, and the third magnetic steel are magnetized along a vibration direction of the vibration sounding device. The first magnetic steel and the third magnetic steel are oppositely disposed. Magnetizing directions of the first magnetic steel and the second magnetic steel are opposite.

Furthermore, the sounding unit further includes a fixing ring. The fixing ring is annular and is stacked and fixed to the third magnetic steel. An outer periphery of the second vibrating diaphragm is supported and fixed to the fixing ring. The magnetic circuit system further includes an auxiliary magnetic steel. The auxiliary magnetic steel is stacked and fixed to a side, close to the vibration system, of the third magnetic steel. The auxiliary magnetic steel is annular and surrounds the insert. The fixing ring is connected to an outer peripheral side of the auxiliary magnetic steel.

Furthermore, the insert includes a first segment, a second segment, and a third segment. The second segment extends from the first segment. The third segment extends from the second segment and faces away from the first segment. The first segment is disposed on an inner peripheral side of the supporting frame. The first segment is fixed to a side, distal from the vibration system, of the first magnetic steel. The first magnetic steel surrounds the second segment. The magnetic bowl extending portion surrounds the third segment. A sectional area of the first segment, a sectional area of the second segment, and a sectional area of the third segment are sequentially reduced.

Furthermore, the second vibrating diaphragm, the fixing ring, and the front cover jointly define an inner sound cavity. A sound outlet penetrates through the fixing ring. The inner sound cavity is communicated with the front sound cavity through the sound outlet.

Furthermore, the vibration unit includes two coils. The two coils are respectively disposed on two opposite sides of the insert along a vibration direction of the vibration unit.

Furthermore, the vibration unit further includes a mass block. The elastic components are respectively fixed to two opposite sides of the mass block along the vibration direction. The coils are fixed to the mass block. A mounting hole penetrates through the mass block. The supporting frame penetrates through the mounting hole and then is fixed to the housing.

Furthermore, a protruding portion is disposed on the housing, and the protruding portion protrudes from the housing along a direction close to the magnetic circuit system. The supporting frame is fixed to the protruding portion.

Compared with the related art, the vibration sounding device of the present disclosure is provided with the vibration system and the magnetic circuit system through the sounding unit. The vibration system includes the first vibration system and the second vibration system. The first vibration system surrounds the second vibration system and is coaxially disposed with the second vibration system. The first vibration system includes the first vibrating diaphragm and the first voice coil. The second vibration system includes the second vibrating diaphragm and the second voice coil. The magnetic circuit system includes the first magnetic gap and the second magnetic gap. The first voice coil is inserted into the first magnetic gap and drives the first vibrating diaphragm to vibrate to generate low pitch. The second voice coil is inserted into the second magnetic gap and drives the second vibrating diaphragm to vibrate to generate high pitch. Such structure enables the low pitch and the high pitch to form a coaxial full-range loudspeaker, which provides high-quality sound effects, thereby enabling the vibration sounding device of the present disclosure to have excellent acoustic performance. According to the vibration sounding device of the present disclosure, the vibration unit including the coils is disposed through the motor vibration system, the vibration unit is suspended in the accommodating space through the elastic components, the vibration unit is disposed on the side, distal from the front cover, of the magnetic circuit system. Such structure enables the vibration sounding device for linear vibration to make full use of mass of the sounding unit and the magnetic steel in the magnetic circuit system, release an internal space of the vibration sounding device to the greatest extent, and further enhance driving force of the linear vibration, so that the vibration sounding device has good vibration performance, and an overall thickness of the vibration sounding device is small, which is beneficial for thinning and lighting of the vibration sounding device.

BRIEF DESCRIPTION OF DRAWINGS

In order to more clearly illustrate technical solutions in embodiments of the present disclosure, drawings required in description of the embodiments are briefly described below. Obviously, the drawings in the following description are merely some embodiments of the present disclosure. For a person of ordinary skill in art, other drawings may be obtained according to the drawings without creative efforts.

DETAILED DESCRIPTION

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Figure 1:
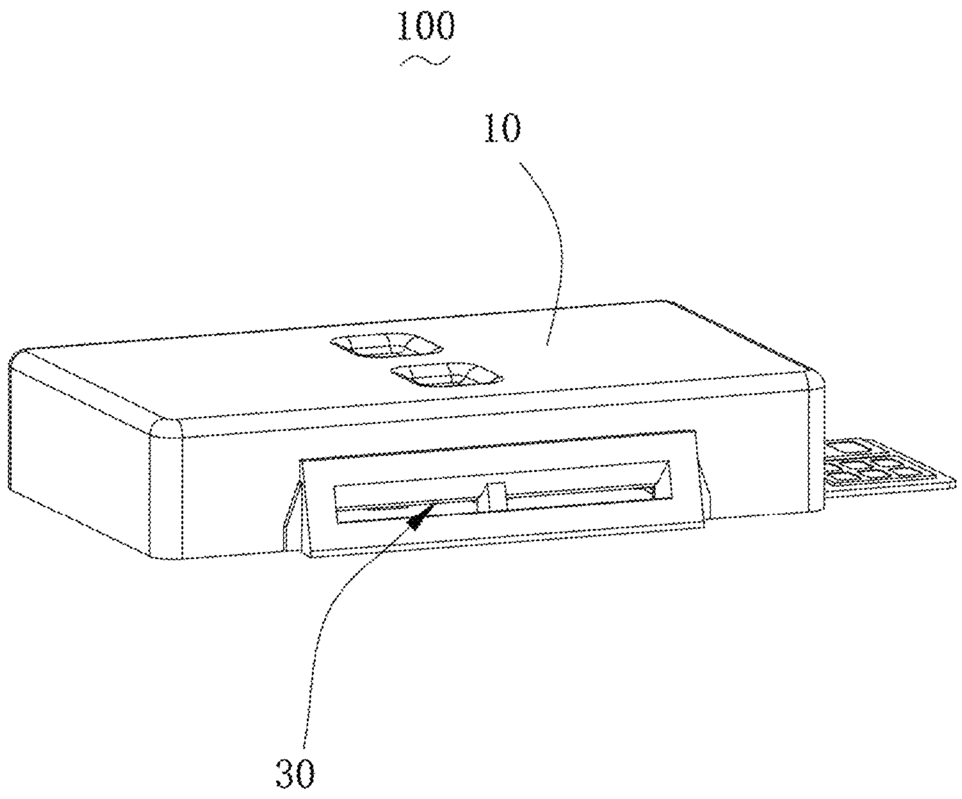
FIG. 1 is a three-dimensional structural schematic diagram of a vibration sounding device according to one embodiment of the present disclosure.
Figure 2:
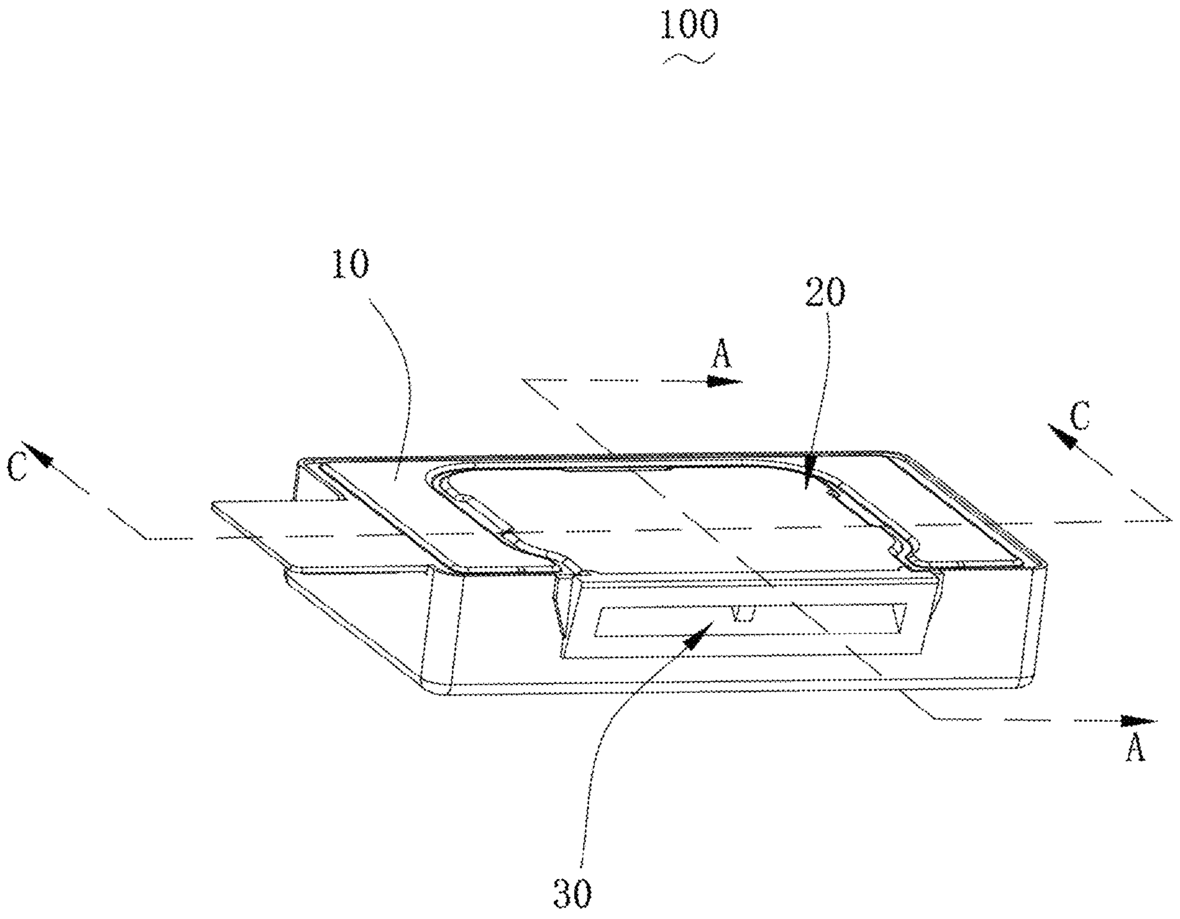
FIG. 2 is another three-dimensional structural schematic diagram of the vibration sounding device according to one embodiment of the present disclosure.
Figure 3:
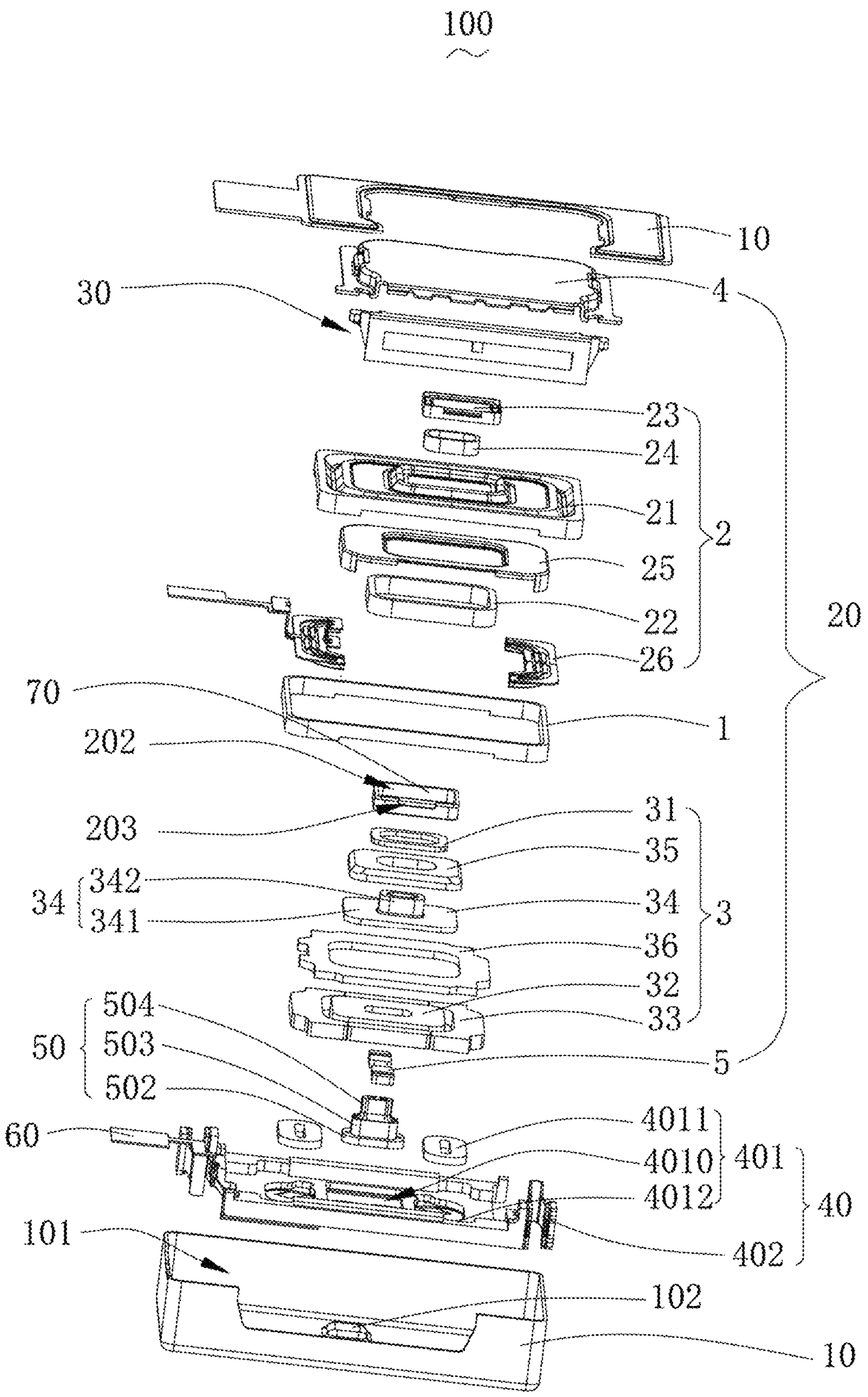
FIG. 3 is an exploded three-dimensional structural schematic diagram of partial of the vibration sounding device according to one embodiment of the present disclosure.
Figure 4:
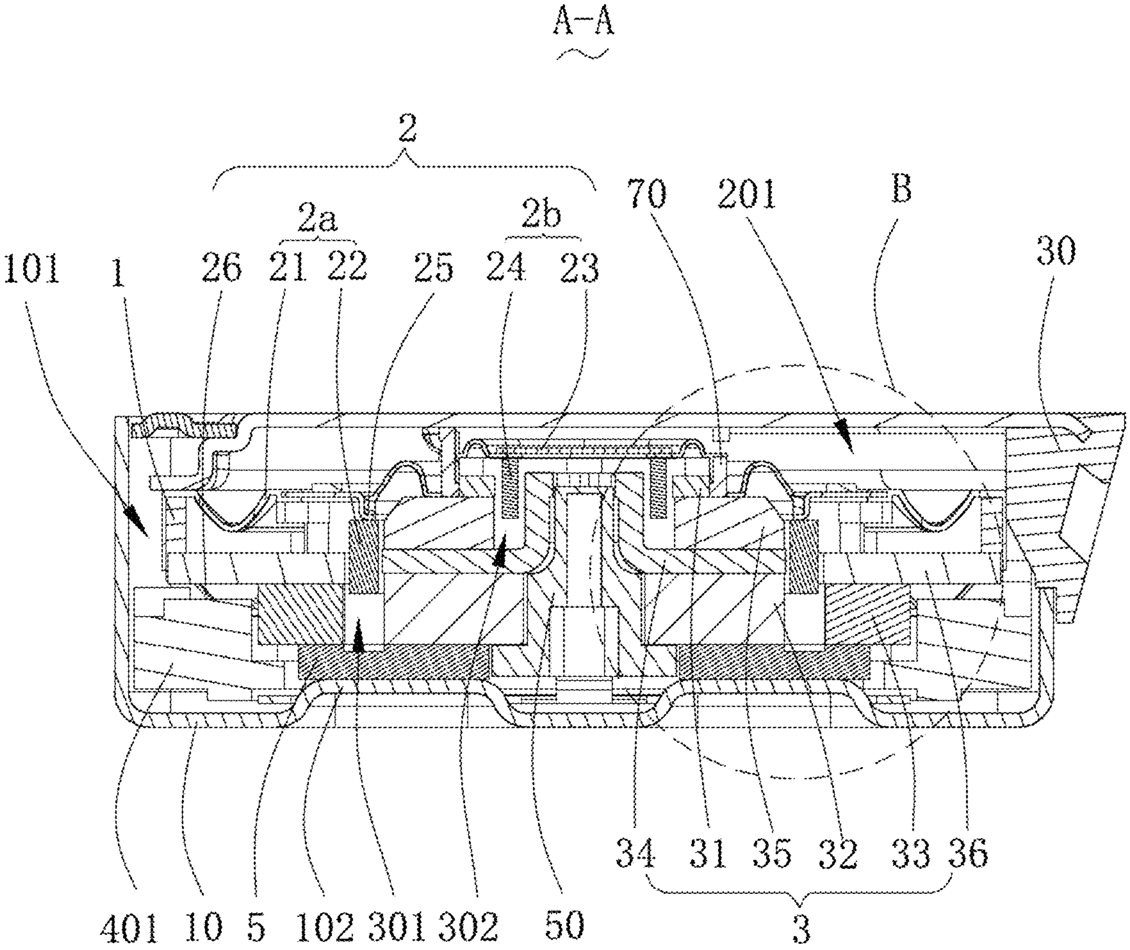
FIG. 4 is a cross-sectional schematic diagram taken along the line A-A shown in FIG. 3.
Figure 5:
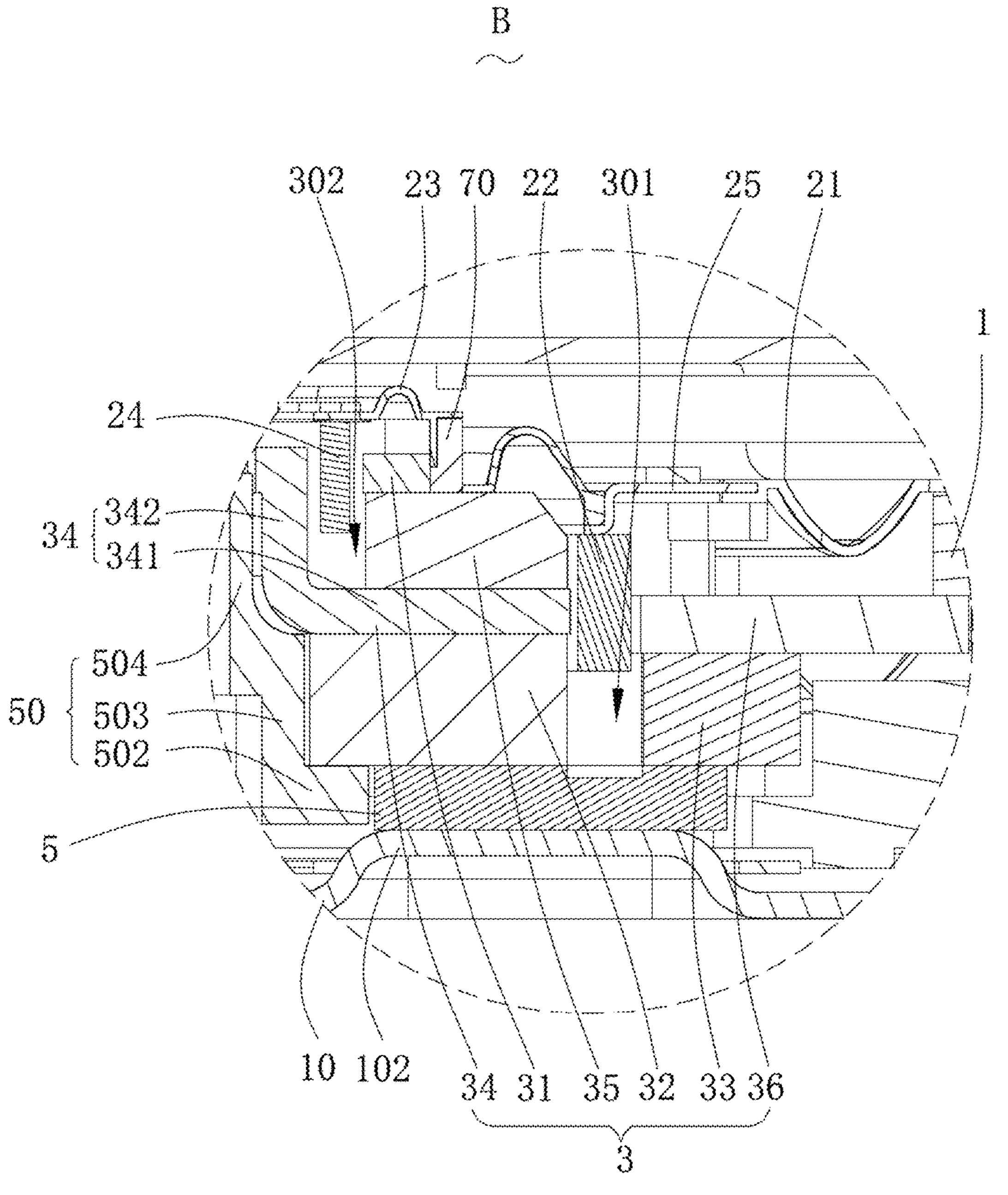
FIG. 5 is an enlarged schematic diagram of portion B shown in FIG. 4.
Figure 6:
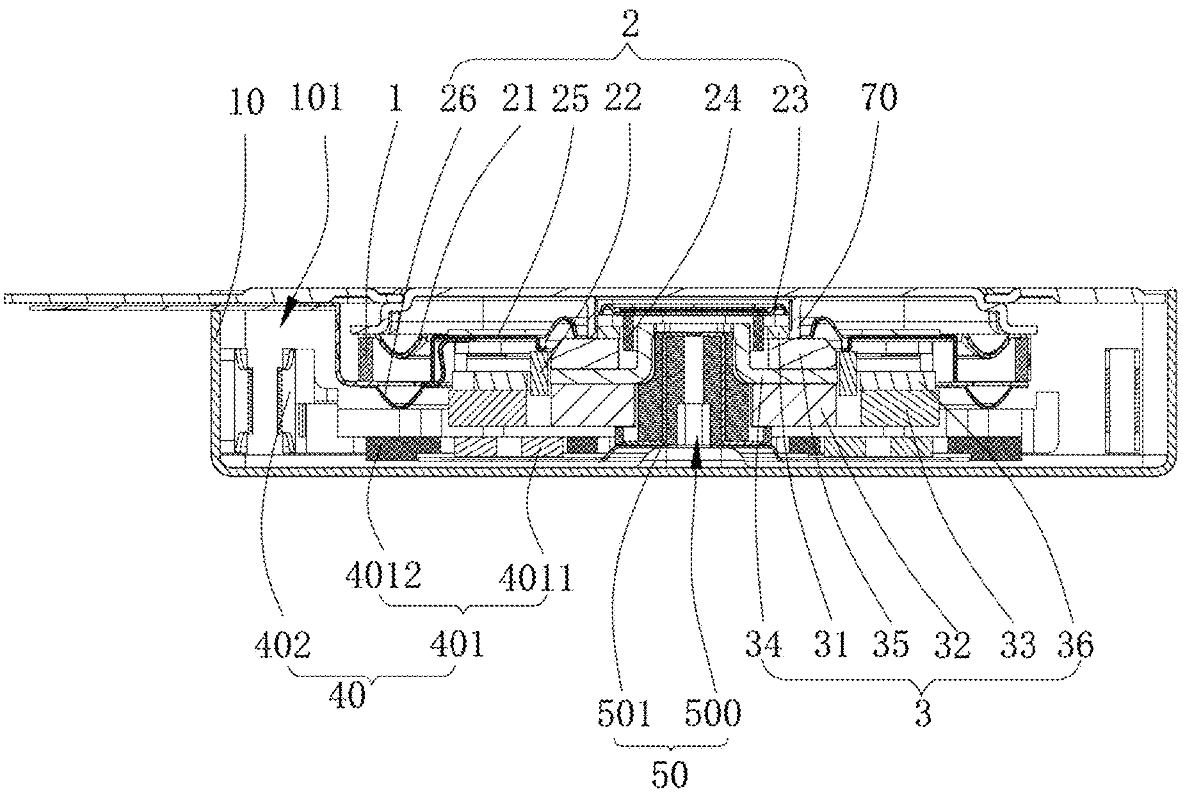
FIG. 6 is a cross-sectional schematic diagram taken along the line C-C shown in FIG. 3.
Figure 7:
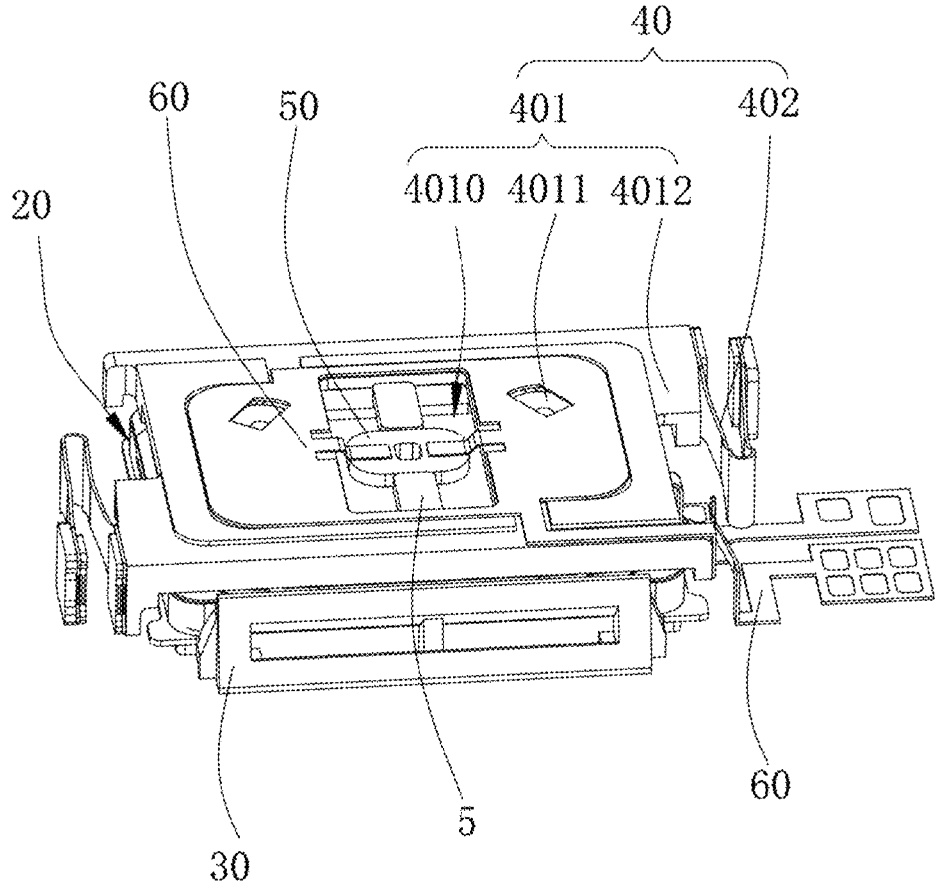
FIG. 7 is a three-dimensional structural schematic diagram of partial of the vibration sounding device where a housing is removed according to one embodiment of the present disclosure.
Figure 8:
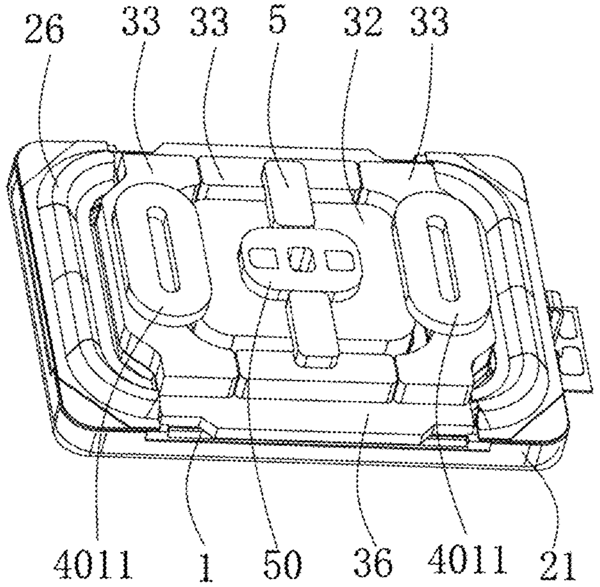
FIG. 8 is a three-dimensional structural schematic diagram of an assembly structure of a sounding unit and coils of the vibration sounding device according to one embodiment of the present disclosure.

The present disclosure provides a vibration sounding device 100, and please refer to FIGS. 1-8 at the same time.

The vibration sounding device 100 includes a housing 10, a sounding unit 20, a sound guide channel 30, a motor vibration system 40, an insert 50, and a conductive component 60. An accommodating space 101 is defined on the housing 10. The sounding unit 20 is accommodated in the accommodating space 101. The sound guide channel 30 is formed in the accommodating space 101. The motor vibration system 40 is accommodated in the accommodating space 101. The conductive component 60 is fixed to the insert 50. The sounding unit 20 is communicated with outside through the sound guide channel 30. The motor vibration system 40 includes coils 4011.

In the embodiment, the housing 10 is assembled by a discrete housing.

The sounding unit 20 includes a frame 1, a vibration system 2, a magnetic circuit system 3, a front cover 4, and a supporting frame 5. The vibration system 2 and the magnetic circuit system 3 are respectively fixed to the frame 1. The front cover 4 is covered and fixed on the vibration system 2. The supporting frame 5 is fixed to the housing 10 and surrounds the insert 50.

In the embodiment, the front cover 4 is fixed to the housing 10 to form a sealing structure. Such structure makes a thickness of the vibration sounding device 100 small, which is beneficial for miniaturization of the vibration sounding device 100.

The front cover 4 and the vibration system 2 are spaced to form a front sound cavity 201. The sound guide channel 30 communicates the front sound cavity 201 with the outside. In the embodiment, the coils 4011 of the motor vibration system 40 are disposed on a side, distal from the front cover 4, of the magnetic circuit system 3.

The vibration system 2 includes a first vibration system 2*a*, a second vibration system 2*b*, a framework 25, and elastic supporting assemblies 26. The first vibration system 2*a*, the second vibration system 2*b*, the framework 25, and the elastic supporting assemblies 26 are fixed to the frame 1.

The first vibration system 2*a* surrounds the second vibration system 2*b* and is coaxially disposed with the second vibration system 2*b*.

The first vibration system 2*a* includes a first vibrating diaphragm 21 and a first voice coil 22. The first vibrating diaphragm 21 is annular and is fixed to the frame 1. The first voice coil 22 is fixed to the first vibrating diaphragm 21 and drives the first vibrating diaphragm 21 to vibrate to generate low pitch.

The second vibration system 2*b* includes a second vibrating diaphragm 23 and a second voice coil 24. The second voice coil 24 is fixed to the second vibrating diaphragm 23 and drives the second vibrating diaphragm 23 to vibrate to generate high pitch.

The first vibrating diaphragm 21 surrounds the second vibrating diaphragm 23 at intervals. The first vibrating diaphragm 21 is disposed on the outside, which increases a size of a woofer, thereby improving acoustic performance of the low pitch of the vibration sounding device 100.

The first vibrating diaphragm 21 is coaxially disposed with the second vibrating diaphragm 23. Such structure enables the low pitch and the high pitch to form a coaxial full-range loudspeaker, which provides high-quality sound effects, thereby enabling the vibration sounding device 100 of the present disclosure to have excellent acoustic performance.

A first end of the framework 25 is connected to the first vibrating diaphragm 21, and a second end of the framework 25 is connected to the first voice coil 22.

The elastic supporting assemblies 26 and the first vibrating diaphragm 21 are disposed at intervals. In the embodiment, the frame is rectangular. In order to fully utilize spaces on two opposite sides of a short shaft of the frame 1, in the embodiment, the elastic supporting assemblies 26 are disposed on the two opposite sides of the short shaft of the frame 1. A first end of each of the elastic supporting assemblies 26 is fixed to the frame 1, and a second end of each of the elastic supporting assemblies 26 is connected to the first voice coil 22 through the framework 25. On one hand, the elastic supporting assemblies 26 are configured to enhance vibration effect of the first vibrating diaphragm 21 and improve acoustic performance of the vibration sounding device 100. On the other hand, the elastic supporting assemblies 26 are configured to balance swing of the vibration system 2 and improve stability of the vibration sounding device 100.

In the embodiment, the vibration system 2 includes two elastic supporting assemblies 26. The two elastic supporting assemblies 26 are respectively disposed on the two opposite sides of the short shaft of the frame 1. The two elastic supporting assemblies 26 are symmetrically disposed and are more stable in supporting of the first voice coil 22, which is better in vibration reliability.

In the embodiment, a side, distal from the first vibrating diaphragm 21, of the magnetic circuit system 3 is fixed to the housing 10. The coils 4011 are disposed in a magnetic field range generated by the magnetic steel of the magnetic circuit system 3, and the magnetic steel of the magnetic circuit system 3 interacts with the coils 4011 to provide a driving force. Such arrangement enables the motor vibration system 40 to make full use of mass of the sounding unit 20 and the magnetic steel in the magnetic circuit system 3, releases an internal space of the vibration sounding device 100 to the greatest extent, and enhances the driving force of linear vibration, so that the vibration sounding device 100 has good vibration performance, and an overall thickness of the vibration sounding device 100 is small, which is beneficial for thinning and lighting of the vibration sounding device 100. In the embodiment, the insert 50 is embedded in a central position of the magnetic circuit system 3.

The magnetic circuit system 3 includes a first magnetic gap 301 and a second magnetic gap 302. The first magnetic gap 301 and the second magnetic gap 302 are disposed at intervals.

The first voice coil 22 is inserted into the first magnetic gap 301 and drives the first vibrating diaphragm 21 to vibrate to generate the low pitch, so that the vibration sounding device 100 provides a low pitch sound effect function.

The second voice coil 24 is inserted into the second magnetic gap 302 and drives the second vibrating diaphragm 23 to vibrate to generate the high pitch, so that the vibration sounding device 100 provides a high pitch sound effect function.

The first magnetic gap 301 surrounds the second magnetic gap 302. Such structure achieves coaxial full-range sound production, so that the vibration sounding device 100 of the present disclosure has good acoustic performance.

Specifically, the magnetic circuit system 3 includes a first magnetic steel 32, a second magnetic steel 33, a magnetic bowl 34, a third magnetic steel 35, and a magnetic conductive plate 36.

The first magnetic steel 32 is annular and is stacked and fixed to the supporting frame 31.

The second magnetic steel 33 is stacked and fixed to the supporting frame 31 and surrounds the first magnetic steel 32. That is, the first magnetic steel 32 and the second magnetic steel 33 are fixedly connected through the supporting frame 31 to form a whole, so that the first magnetic steel 32 and the second magnetic steel 33 are connected on a magnetic circuit. Meanwhile, the first magnetic steel 32 and the second magnetic steel 33 are fixed to the housing 10 through the supporting frame 31.

The magnetic bowl 34 includes a magnetic bowl body 341 and a magnetic bowl extending portion 342. The magnetic bowl body 341 is annular and is stacked and fixed to the first magnetic steel 32. The magnetic bowl extending portion 342 is annular and is bent and extends along a direction distal from the supporting frame 31 from an inner circumferential side of the magnetic bowl body 341. The magnetic bowl extending portion 342 surrounds the insert 50. Such structure provides a slot on the magnetic bowl 34, and the insert 50 is inserted into the slot, so that the first magnetic gap 301 is distal from the insert 50, which achieves a large size of the first vibrating diaphragm 21 for generating the low pitch and further provides a good low pitch sound effect.

The third magnetic steel 35 is stacked and fixed to a side, close to the vibration system 2, of the magnetic bowl body 341.

The first magnetic steel 32 and the third magnetic steel 35 are spaced apart from the second magnetic steel 33 to form the first magnetic gap 301.

The third magnetic steel 35 surrounds the magnetic bowl extending portion 342, and the third magnetic steel 35 and the magnetic bowl extending portion 342 are spaced apart from each other to form the second magnetic gap 302. Such structure enables the first magnetic gap 301 and the second magnetic gap 302 to form a coaxial sound production structure around the insert 50.

Specifically, the first magnetic steel 32, the second magnetic steel 33, and the third magnetic steel 35 are magnetized along a vibration direction of the vibration sounding device 100. The first magnetic steel 32 and the third magnetic steel 35 are oppositely disposed. That is, magnetizing directions of the first magnetic steel 32 and the third magnetic steel 35 are opposite. Magnetizing directions of the first magnetic steel 32 and the second magnetic steel 33 are opposite.

The magnetic conductive plate 36 is stacked and fixed to the second magnetic steel 33, and the magnetic conductive plate 36 is fixedly connected to the frame 1. The magnetic circuit system 3 is fixed to the frame 1 through the magnetic conductive plate 36.

In the embodiment, an outer side of the magnetic conductive plate 36 is fixed to two opposite sides of a long shaft of the frame 1.

In the embodiment, the sounding unit 20 further includes a fixing ring 70. The fixing ring 70 is annular and is stacked and fixed to the third magnetic steel 35. An outer periphery of the second vibrating diaphragm 23 is supported and fixed to the fixing ring 70. In the embodiment, the fixing ring 70 is an annular steel ring.

In the embodiment, a first end of the fixing ring 70 is fixed to the front cover 4, and a second end of the fixing ring 70 is fixed to the magnetic circuit system 3. The fixing ring 70 is configured to fix the magnetic circuit system 3 to the front cover 4. That is, the magnetic circuit system 3 is fixed to the housing 10 through being fixed to the front cover 4. The other side of the magnetic circuit system 3 is directly fixed to the housing 10. Such structure enables the sounding unit 20 to remain intact when the vibration sounding device 100 vibrates, thereby improving reliability of the vibration sounding device 100.

The second vibrating diaphragm 23, the fixing ring 70, and the front cover 4 jointly define an inner sound cavity 202. A sound outlet 203 penetrates through the fixing ring 70. The inner sound cavity 202 is communicated with the front sound cavity 201 through the sound outlet 203. The inner sound cavity 202 and the sound outlet 203 enhance acoustic effect of the high pitch generated by the second vibrating diaphragm 23, and improve acoustic performance of the high pitch.

In the embodiment, the magnetic circuit system 3 further includes an auxiliary magnetic steel 31. The auxiliary magnetic steel 31 is stacked and fixed to a side, close to the vibration system 2, of the third magnetic steel 35.

The auxiliary magnetic steel 31 is annular and surrounds the insert 50. The fixing ring 70 is connected to an outer peripheral side of the auxiliary magnetic steel 31. The auxiliary magnetic steel 31 is configured to position and mount the fixing ring 70 during assembly, so that the vibration sounding device 100 is easy to produce and improve production yield. Furthermore, such structure enables the fixing ring 70 to be more firmly fixed on the outer peripheral side of the auxiliary magnetic steel 31 and be fixed on an upper portion of the third magnetic steel 35, so that the fixing ring 70 is better fixed to the magnetic circuit system 3.

The auxiliary magnetic steel 31 and the third magnetic steel 35 stacked in sequence are spaced apart from the magnetic bowl extending portion 342 to form the second magnetic gap 302. The auxiliary magnetic steel 31 enables heights of the magnetic steels on two sides of the second magnetic gap 302 to be the same, and enables a peripheral position of the auxiliary magnetic steel 31 to fix the fixing ring 70, makes full use of an internal space, and strengthens magnetic line of force of the magnetic circuit formed by the second magnetic gap 302, so that an internal structure of the vibration sounding device 100 is compact and the acoustic effect is good, which is beneficial for the miniaturization of the vibration sounding device 100.

The motor vibration system 40 includes a vibration unit 401 and elastic components 402. The elastic components 402 suspend the vibration unit 401 in the accommodating space 101.

The vibration unit 401 is disposed on the side, distal from the front cover 4, of the magnetic circuit system 3. Specifically, the vibration unit 401 includes the coils 4011 and a mass block 4012.

Specifically, the coils 4011 are fixed to the mass block 4012. The vibration unit 401 includes two coils 4011. The two coils 4011 are respectively disposed on two opposite sides of the insert 50 along a vibration direction of the vibration unit 401. Specifically, the first magnetic steel 32 and the second magnetic steel 33 are disposed opposite to the coils 4011 at intervals. The coils 4011 are disposed in a magnetic field range of the first magnetic steel 32 and the second magnetic steel 33. Such structure enables the vibration sounding device 100 for linear vibration to make full use of mass of the sounding unit 20 and the magnetic steel in the magnetic circuit system 3, releases an internal space of the vibration sounding device 100 to the greatest extent, and enhances driving force of the linear vibration, so that the vibration sounding device 100 has good vibration performance, and an overall thickness of the vibration sounding device 100 is small, which is beneficial for thinning and lighting of the vibration sounding device 100.

The mass block 4012 is configured to counterweight, and a weight of the vibration unit 401 is increased, so that vibration amplitude of the vibration unit 401 is improved, and the motor vibration system 40 outputs a higher acceleration, thereby improving the vibration performance of the vibration sounding device 100.

In the embodiment, a mounting hole 4010 penetrates through the mass block 4012, and the supporting frame 31 penetrates through the mounting hole 4010 and then is fixed to the housing 10. Such structure makes the internal structure of the vibration sounding device 100 compact and has good acoustic effect, which is beneficial for the miniaturization of the vibration sounding device 100.

In order to better reduce the thickness of the vibration sounding device 100, in the embodiment, a protruding portion 102 is disposed on the housing 10 and protrudes along a direction close to the magnetic circuit system 3, and the supporting frame 31 is fixed to the protruding portion 102.

In the embodiment, at least two elastic components 402 are respectively fixed to two opposite sides of the mass block 4012 along the vibration direction, and the at least two elastic components 402 are respectively disposed on the two opposite sides of the mass block 4012 along the vibration direction of the vibration unit 401. The at least two elastic components 402 may be V-shaped or C-shaped springs. In the embodiment, the at least two elastic components 402 are V-shaped springs.

The insert 50 is inserted into the magnetic circuit system 3 from one side, distal from the first vibrating diaphragm 21, of the magnetic circuit system 3. The insert 50 is fixed to the magnetic circuit system 3. The magnetic circuit system 3 is disposed around the insert 50. A conductive terminal 501 penetrates through the insert 50. The second voice coil 24 is connected to the conductive component 60 through the conductive terminal 501. Such structure is beneficial for electrical connection of the second vibration system **2*b* and improves reliability of the vibration sounding device 100**.

Specifically, the insert 50 includes a first segment 502, a second segment 503, and a third segment 504. The second segment 503 extends from the first segment 502. The third segment 504 extends from the second segment 503 and faces away from the first segment 502. The first segment 502 is disposed on an inner peripheral side of the supporting frame 31. The first segment 502 is fixed to a side, distal from the vibration system 2, of the first magnetic steel 32. The first magnetic steel 32 surrounds the second segment 503. A second magnetic steel extending portion 242 surrounds the third segment 504. A leakage channel 500 further penetrates through the insert 50.

In the embodiment, a sectional area of the first segment 502, a sectional area of the second segment 503, and a sectional area of the third segment 504 are sequentially reduced. Such structure enables easy assembly of the insert 50 and the magnetic circuit system 3.

A first end of the conductive component 60 is connected to the conductive terminal 501, and a second end of the conductive component 60 penetrates through the housing 10 and is at least partially exposed out of the housing 10.

Compared with related art, the vibration sounding device of the present disclosure is provided with the vibration system and the magnetic circuit system through the sounding unit. The vibration system includes the first vibration system and the second vibration system. The first vibration system surrounds the second vibration system and is coaxially disposed with the second vibration system. The first vibration system includes the first vibrating diaphragm and the first voice coil. The second vibration system includes the second vibrating diaphragm and the second voice coil. The magnetic circuit system includes the first magnetic gap and the second magnetic gap. The first voice coil is inserted into the first magnetic gap and drives the first vibrating diaphragm to vibrate to generate low pitch. The second voice coil is inserted into the second magnetic gap and drives the second vibrating diaphragm to vibrate to generate high pitch. Such structure enables the low pitch and the high pitch to form a coaxial full-range loudspeaker, which provides high-quality sound effects, thereby enabling the vibration sounding device of the present disclosure to have excellent acoustic performance. According to the vibration sounding device, the vibration unit with the coils is disposed through the motor vibration system, the vibration unit is suspended in the accommodating space through the elastic components, the vibration unit is disposed on the side, distal from the front cover, of the magnetic circuit system. Such structure enables the vibration sounding device for linear vibration to make full use of mass of the sounding unit and the magnetic steel in the magnetic circuit system, releases an internal space of the vibration sounding device to the greatest extent, and enhances driving force of the linear vibration, so that the vibration sounding device has good vibration performance, and an overall thickness of the vibration sounding device is small, which is beneficial for thinning and lighting of the vibration sounding device.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A vibration sounding device, comprising:

a housing;

a sounding unit;

a sound guide channel; and a motor vibration system;

wherein an accommodating space is defined in the housing, the sounding unit is accommodated in the accommodating space, the sound guide channel is formed in the accommodating space, and the sounding unit is communicated with outside through the sound guide channel;

the motor vibration system is accommodated in the accommodating space, the motor vibration system comprises a vibration unit and elastic components, the elastic components suspend the vibration unit in the accommodating space, and the vibration unit comprises coils;

the sounding unit comprises a frame, a vibration system, a magnetic circuit system, and a front cover; the vibration system and the magnetic circuit system are respectively fixed to the frame, and the front cover is covered and fixed on the vibration system; the front cover and the vibration system are spaced to form a front sound cavity, the sound guide channel communicates the front sound cavity with the outside, the vibration unit is disposed on a side, distal from the front cover, of the magnetic circuit system;

the vibration system comprises a first vibration system and a second vibration system, the first vibration system and the second vibration system are fixed to the frame, the first vibration system surrounds the second vibration system, and the first vibration system is coaxially disposed with the second vibration system; the first vibration system comprises a first vibrating diaphragm and a first voice coil, the first vibrating diaphragm is annular and is fixed to the frame, the first voice coil is fixed to the first vibrating diaphragm and drives the first vibrating diaphragm to vibrate and sound, the second vibration system comprises a second vibrating diaphragm and a second voice coil, the second voice coil is fixed to the second vibrating diaphragm and drives the second vibrating diaphragm to vibrate and sound, the first vibrating diaphragm surrounds the second vibrating diaphragm at intervals;

the magnetic circuit system comprises a first magnetic gap and a second magnetic gap, the first magnetic gap and the second magnetic gap are disposed at intervals, the first magnetic gap surrounds the second magnetic gap, the first voice coil is inserted into the first magnetic gap and drives the first vibrating diaphragm to vibrate to generate low pitch, and the second voice coil is inserted into the second magnetic gap and drives the second vibrating diaphragm to vibrate to generate high pitch;

wherein the vibration sounding device further comprises an insert and a conductive component, the insert is inserted into the magnetic circuit system from one side, distal from the first vibrating diaphragm, of the magnetic circuit system; the insert is fixed to the magnetic circuit system, and the conductive component is fixed to the insert; the magnetic circuit system is disposed around the insert, a conductive terminal penetrates through the insert, the second voice coil is connected to the conductive component through the conductive terminal, a first end of the conductive component is connected to the conductive terminal, and a second end of the conductive component penetrates through the housing and is at least partially exposed out of the housing.

2. The vibration sounding device according to claim 1, wherein the sounding unit further comprises a supporting frame, the supporting frame is fixed to the housing and surrounds the insert; the magnetic circuit system comprises a first magnetic steel, a second magnetic steel, a magnetic bowl, a third magnetic steel, and a magnetic conductive plate; the first magnetic steel is annular and is stacked and fixed to the supporting frame, the second magnetic steel is stacked and fixed to the supporting frame and surrounds the first magnetic steel, the first magnetic steel and the third magnetic steel are spaced apart from the second magnetic steel to form the first magnetic gap, the first magnetic steel and the second magnetic steel are disposed opposite to the coils at intervals, the coils are disposed in a magnetic field range of the first magnetic steel and the second magnetic steel;

the magnetic bowl comprises a magnetic bowl body and a magnetic bowl extending portion; the magnetic bowl body is annular and is stacked and fixed to the first magnetic steel, the magnetic bowl extending portion is annular and is bent and extends along a direction distal from the supporting frame from an inner circumferential side of the magnetic bowl body, the magnetic bowl extending portion surrounds the insert;

the third magnetic steel is stacked and fixed to a side, close to the vibration system, of the magnetic bowl body; the third magnetic steel surrounds the magnetic bowl extending portion, the third magnetic steel and the magnetic bowl extending portion are spaced apart from each other to form the second magnetic gap;

the magnetic conductive plate is stacked and fixed to the second magnetic steel, and the magnetic conductive plate is fixedly connected to the frame.

3. The vibration sounding device according to claim 2, wherein the first magnetic steel, the second magnetic steel, and the third magnetic steel are magnetized along a vibration direction of the vibration sounding device, the first magnetic steel and the third magnetic steel are oppositely disposed, and magnetizing directions of the first magnetic steel and the second magnetic steel are opposite.

4. The vibration sounding device according to claim 3, wherein the sounding unit further comprises a fixing ring, the fixing ring is annular and is stacked and fixed to the third magnetic steel, an outer periphery of the second vibrating diaphragm is supported and fixed to the fixing ring; the magnetic circuit system further comprises an auxiliary magnetic steel, the auxiliary magnetic steel is stacked and fixed to a side, close to the vibration system, of the third magnetic steel; the auxiliary magnetic steel is annular and surrounds the insert, and the fixing ring is connected to an outer peripheral side of the auxiliary magnetic steel.

5. The vibration sounding device according to claim 4, wherein the insert comprises a first segment, a second segment, and a third segment; the second segment extends from the first segment, the third segment extends from the second segment and faces away from the first segment; the first segment is disposed on an inner peripheral side of the supporting frame, and the first segment is fixed to a side, distal from the vibration system, of the first magnetic steel; the first magnetic steel surrounds the second segment, the magnetic bowl extending portion surrounds the third segment; and a sectional area of the first segment, a sectional area of the second segment, and a sectional area of the third segment are sequentially reduced.

6. The vibration sounding device according to claim 4, wherein the second vibrating diaphragm, the fixing ring, and the front cover jointly define an inner sound cavity, a sound outlet penetrates through the fixing ring, and the inner sound cavity is communicated with the front sound cavity through the sound outlet.

7. The vibration sounding device according to claim 2, wherein the vibration unit further comprises a mass block, the elastic components are respectively fixed to two opposite sides of the mass block along a vibration direction, the coils are fixed to the mass block, a mounting hole penetrates through the mass block, and the supporting frame penetrates through the mounting hole and then is fixed to the housing.

8. The vibration sounding device according to claim 7, wherein a protruding portion is disposed on the housing, and the protruding portion protrudes from the housing along a direction close to the magnetic circuit system; the supporting frame is fixed to the protruding portion.

9. The vibration sounding device according to claim 1, wherein the vibration unit comprises two coils, and the two coils are respectively disposed on two opposite sides of the insert along a vibration direction of the vibration unit.

* * * * *